US 10,731,382 B2

United States Patent
Ketels et al.

(10) Patent No.: US 10,731,382 B2
(45) Date of Patent: Aug. 4, 2020

(54) ACTUATOR FOR A VEHICLE COMPARTMENT

(71) Applicant: Faurecia Interior Systems, Inc., Auburn Hills, MI (US)

(72) Inventors: Cedric Ketels, Mountain View, CA (US); Tristan J. Vanfossen, Belmont, MI (US); Julien Rea, Sunnyvale, CA (US); Louis Thomas, Santa Clara, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/020,187

(22) Filed: Jun. 27, 2018

(65) Prior Publication Data

US 2020/0002978 A1 Jan. 2, 2020

(51) Int. Cl.
  *E05B 51/00* (2006.01)
  *E05B 83/30* (2014.01)
  *E05B 81/04* (2014.01)
  *B60K 37/06* (2006.01)
  *B60R 7/06* (2006.01)

(52) U.S. Cl.
  CPC ............ *E05B 51/005* (2013.01); *B60K 37/06* (2013.01); *E05B 81/04* (2013.01); *E05B 83/30* (2013.01); *B60K 2370/1438* (2019.05); *B60K 2370/55* (2019.05); *B60R 7/06* (2013.01)

(58) Field of Classification Search
  CPC ........ E05B 51/005; E05B 15/04; E05B 81/04; E05B 83/30
  USPC ...................................... 296/37.12
  See application file for complete search history.

(56) References Cited

U.S. PATENT DOCUMENTS

| 3,873,881 | A  | 3/1975  | Inoue     |
| 7,380,843 | B2 | 6/2008  | Alacqua   |
| 7,500,704 | B2 | 3/2009  | Herrera   |
| 7,766,409 | B2 | 8/2010  | Ohnuki    |
| 7,832,239 | B2 | 11/2010 | Kozuka    |
| 8,443,600 | B2 | 5/2013  | Butera    |
| 8,596,704 | B2 | 12/2013 | Sielhorst |
| 8,915,524 | B2 | 12/2014 | Charnesky |
| 9,316,031 | B2 | 4/2016  | Abe       |
| 2005/0023086 | A1 | 2/2005 | Szilagyi  |

(Continued)

FOREIGN PATENT DOCUMENTS

| DE | 10349032         | 5/2005 |
| DE | 102010030645 A1  | 7/2011 |

(Continued)

OTHER PUBLICATIONS

Badescu et al., Compact, Low-Force, Low-Noise Linear Actuator, Tech Briefs, Oct. 1, 2012, available at https://www.techbriefs.com/component/content/article/tb/techbriefs/mechanics-and-machinery/14923, 3 pages.

(Continued)

*Primary Examiner* — Joseph D. Pape
(74) *Attorney, Agent, or Firm* — Barnes & Thornburg LLP

(57) ABSTRACT

A vehicle includes a compartment mounted to a frame of the vehicle. The compartment includes a box coupled to a vehicle in a fixed position relative to the vehicle and a latch system coupled to the glove to allow a user access to the box. The latch system includes a shape-memory alloy wire guided by a pulley during actuation of the latch system.

13 Claims, 3 Drawing Sheets

(56) References Cited

U.S. PATENT DOCUMENTS

2008/0007081 A1* 1/2008 Shibata .................. B60R 7/06
                                                  296/37.12
2008/0100079 A1   5/2008 Herrera
2013/0305705 A1  11/2013 Ac
2018/0106079 A1   4/2018 Alacqua

FOREIGN PATENT DOCUMENTS

DE   10201003064564       7/2011
DE   102012000913 A1      7/2013
FR         2655598        6/1991
KR        20050069284     7/2005
KR        20150032168     3/2015

OTHER PUBLICATIONS

Office Action dated Nov. 12, 2019 for U.S. Appl. No. 16/020,194 (pp. 1-6).
Office Action dated Jan. 10, 2020 for US Appl. No. 16/020,201, IDFAUH18047 II (pp. 1-8).
Office Action dated Jan. 16, 2020 for US Appl. No. 16/020,201, IDFAUH18047 US-U II (pp. 1-8).

* cited by examiner

ACTUATOR FOR A VEHICLE COMPARTMENT

BACKGROUND

The present disclosure relates to actuators for a compartment, and particularly to actuators adapted for use with vehicle compartments. More particularly, the present disclosure relates to actuators adapted for use with glove box compartments.

SUMMARY

According to the present disclosure, a vehicle includes a glove compartment mounted to a frame of the vehicle. The glove compartment includes a glove box coupled to a vehicle in a fixed position relative to the vehicle and a latch system coupled to the glove box to allow a user access to the glove box. The glove box includes a container formed to include an aperture arranged to open into a space formed in the container and a lid coupled to the container to move relative to the container between a closed position and an open position.

In illustrative embodiments, the latch system includes a latch configured to change the lid from the closed position to the open position and an actuator coupled to the latch and configured to cause the latch to change the lid from the closed position to the open position in response to an input from a user. In illustrative embodiments, the actuator includes a shape-memory alloy wire coupled to the latch to move the latch in response to changes in length of the shape-memory alloy wire, a wire guide coupled to the container and configured to engage and guide the shape-memory alloy wire as the shape-memory allow wire changes lengths, and a control system coupled to the shape-memory alloy wire and configured to apply power to the shape-memory alloy wire to cause the shape-memory alloy wire to change lengths in response to receipt of the input to the control system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
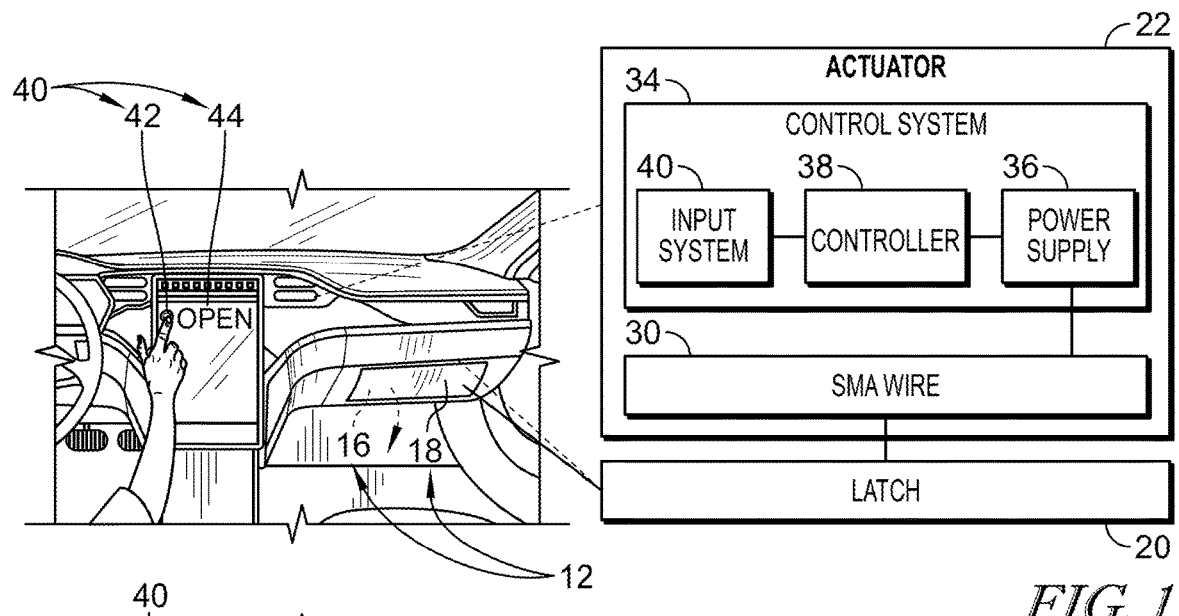
FIG. 1 is a perspective and diagrammatic view of a glove compartment in accordance with the present disclosure showing that the glove compartment includes a glove box and a latch system coupled to the glove box to allow the glove box to change between a closed position and an open position in response to an input provided by a control system.
Figure 2:
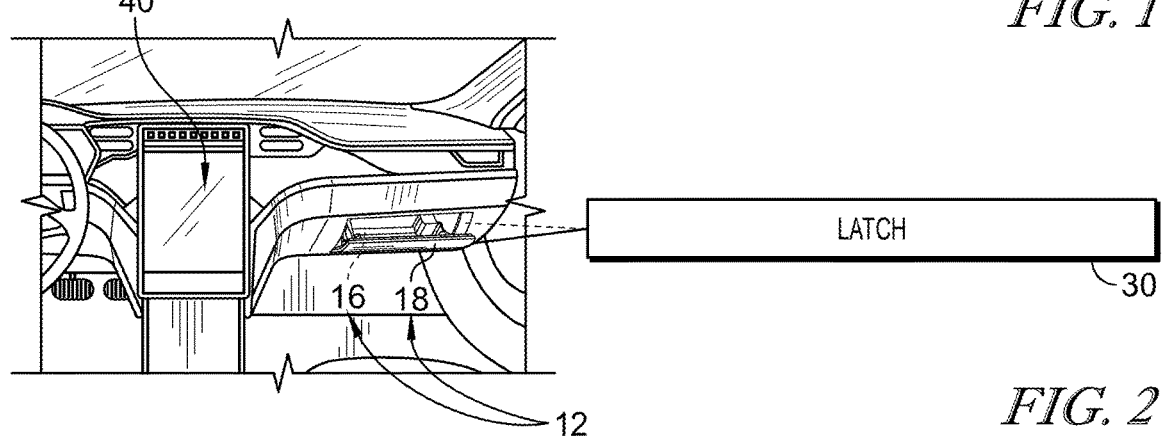
FIG. 2 is a view similar to FIG. 1 in which the latch system has been engaged to cause the glove box to move to the open position in response to receipt of the input provided by a passenger.
Figure 3:
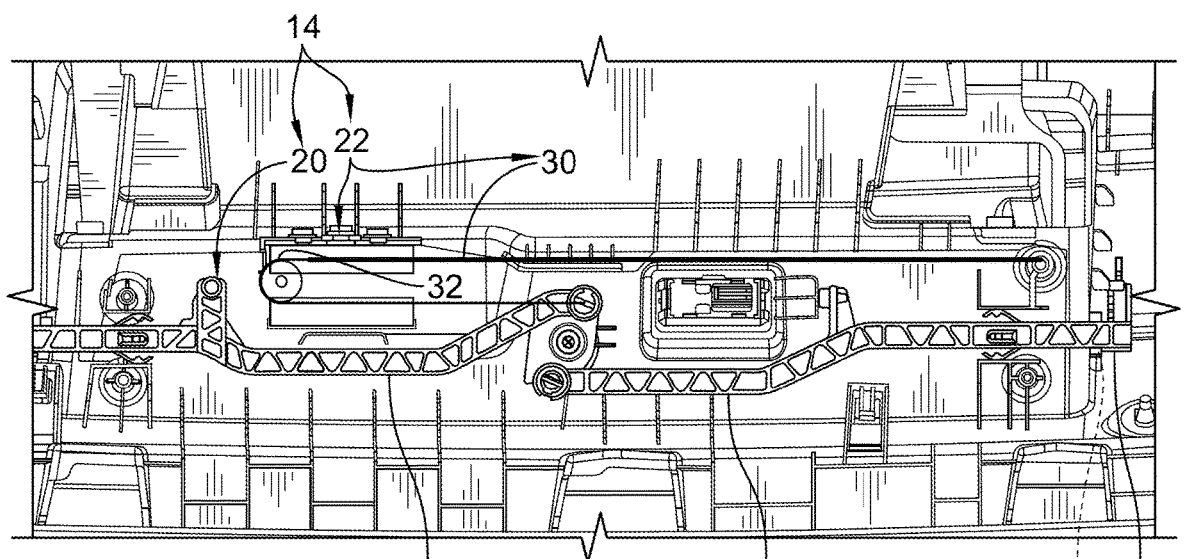
Figure 4:
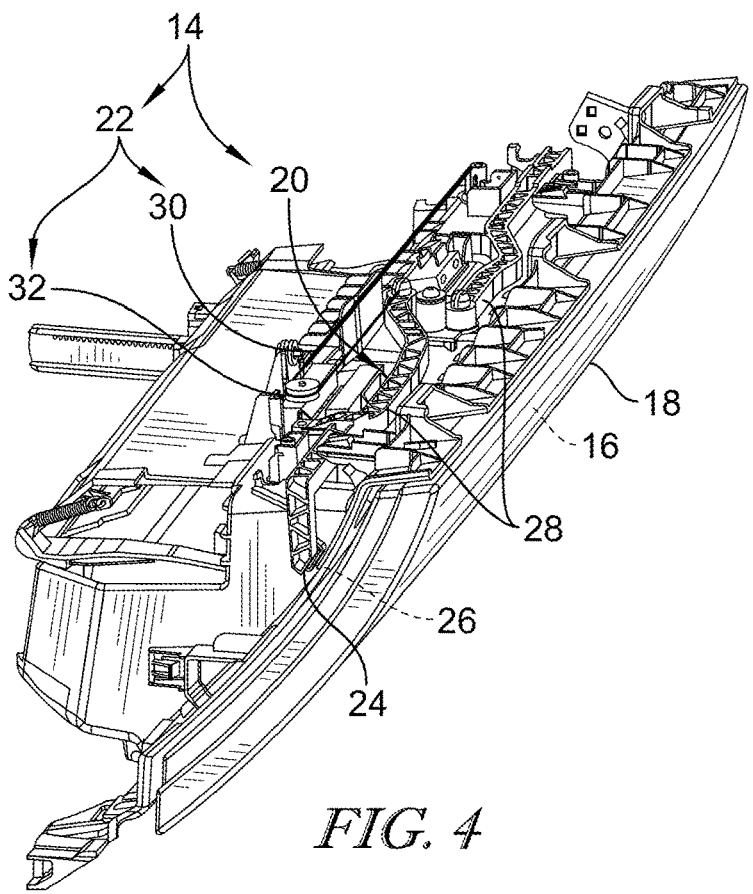
Figure 5:
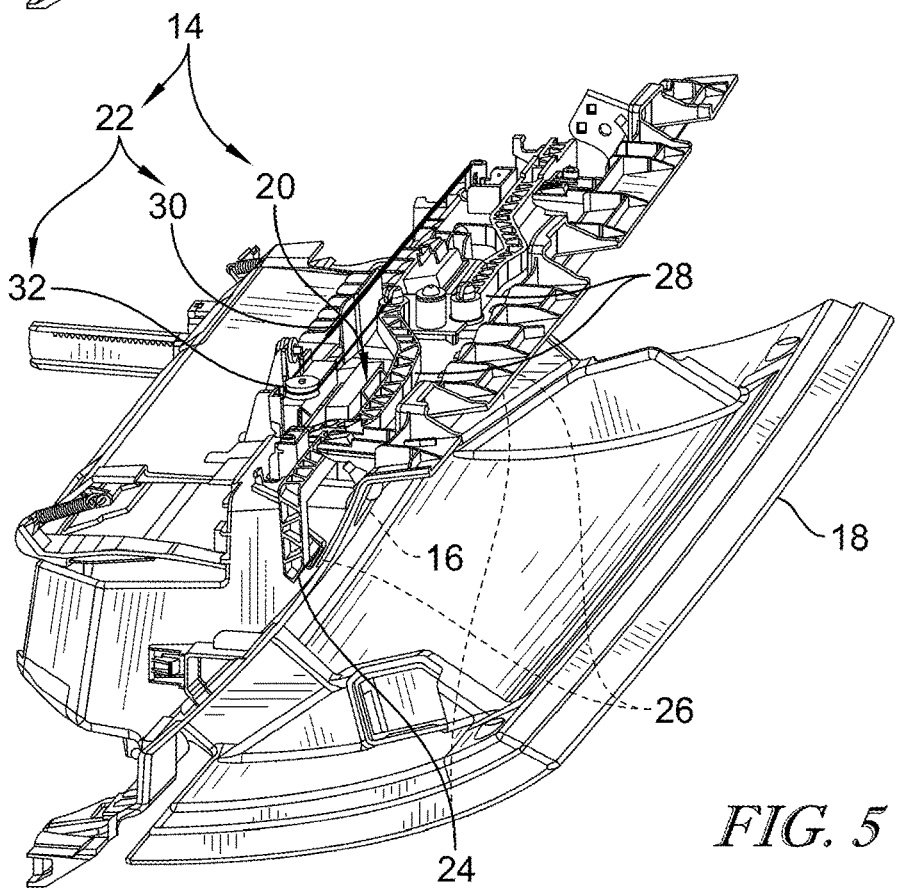
Figure 6:
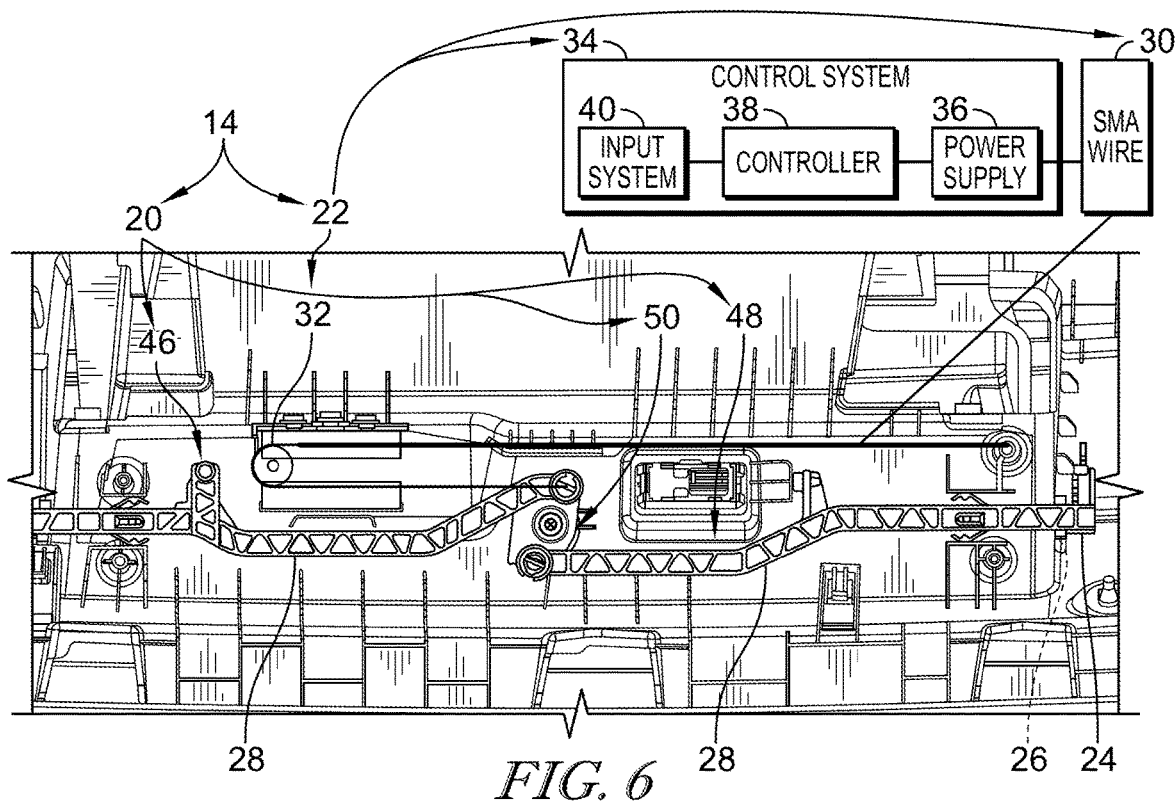
Figure 7:
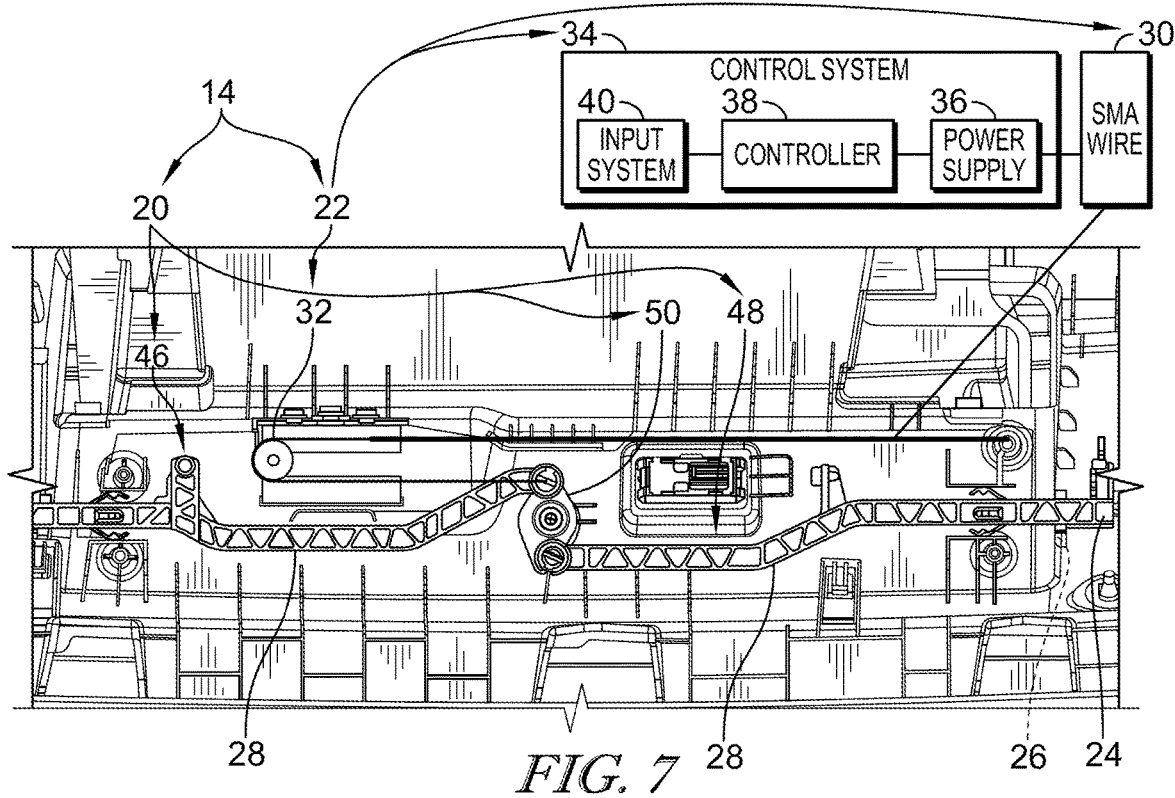

FIG. 3 is a partial plan view of the glove box of FIGS. 1 and 2 showing the latch system including a latch and an actuator coupled to the latch and configured to move the latch from a first position to a second position, the actuator including a shape-memory alloy wire coupled to the latch and configured to change between a first length and a second length shown in FIG. 7 in response to the input from the passenger;

FIG. 4 is a perspective view of the glove compartment of FIGS. 1 and 2 showing the latch system in the first position and the glove box in the closed position;

FIG. 5 is similar view to FIG. 4 showing the latch system in the second position and the glove box in the open position;

FIG. 6 is partial plan view and diagrammatic view of the glove box showing the shape-memory alloy wire at the first length causing the latch to be in the first position; and FIG. 7 is a view similar to FIG. 6 showing the shape-memory alloy wire has changed from the first length to the second length causing the latch to move from the first position to the second position to cause the glove box to be in the open position.

DETAILED DESCRIPTION

A glove compartment 10 includes a glove box 12 and a latch system 14 as shown in FIGS. 1-3. The glove box 12 is adapted to be coupled to a vehicle in a fixed position relative to the vehicle. The latch system 14 is coupled to the glove box 12 and allows a user access to the glovebox 12.

The glove box 12 includes a container 16 and a lid 18 as shown in FIG. 4. The container 16 is formed to include an aperture arranged to open into a space formed in the container 16. The lid 18 is coupled to the container 16 and moves relative to the container 16 between a closed position as shown in FIGS. 1 and 4 and an open position as shown in FIGS. 2 and 5.

The latch system 14 includes a latch 20 and an actuator 22 as shown in FIGS. 3-7. The latch 20 is configured to allow the lid 18 to move between the closed position and the open position. The lid 18 is in the closed position when the lid 18 closes the aperture and blocks access to the space. The lid 18 is in the open position when the lid 18 has moved away from the container 16 to allow access to the space through the aperture. The actuator 22 is coupled to the latch 20 and is configured to move the latch 20.

The latch 20 includes a lock tab 24, a lock-tab receiver 26, and a tab-mover arm 28 as shown in FIG. 4. The lock tab 24 is movable in between a first position as shown in FIG. 6 and a second position as shown in FIG. 7. The lock-tab receiver 26 is configured to receive the lock tab 24 therein when the lock tab 24 is in the first position and the lid 18 is in the closed position. The tab-mover arm 28 is coupled to the lock tab 24 to move therewith.

The actuator 22 includes a shape-memory alloy wire 30, a wire guide 32, and a control system 34 as shown in FIGS. 3-7. The shape-memory alloy wire 30 is coupled to the tab-mover arm 28 to move the tab-mover arm 28 in response to changes in length of the shape-memory alloy wire 30. The shape-memory alloy wire 30 changes between a first length as shown in FIG. 6 associated with the first position of the lock tab 24 and a relatively smaller second length as shown in FIG. 7 associated with the second position of the lock tab 24. The shape-memory alloy wire 30 changes between the first length and the relatively smaller second length to allow the lid 18 to change from the closed position to the open position. The wire guide 32 is coupled to the container 16 and is configured to engage and guide the shape-memory alloy wire 30 as the shape-memory allow wire 30 changes between the first length as shown in FIGS. 4 and 5 and the relatively smaller second length as shown in FIGS. 6 and 7.

In one example, the wire guide 32 is a pulley that is configured to rotate about an axis relative to the container in response to the shape-memory alloy wire 30 changing between the first length and the relatively smaller second length. The control system 34 is coupled to the shape-memory alloy wire 30 and is configured to apply power to the shape-memory alloy wire 30 to cause the shape-memory alloy wire 30 to change between the first and second lengths in response to receipt of the input to the control system 34. In one example, the change in length from the first length to the relatively small second length is about 8 millimeters and occurs in about 0.8 seconds. The change in length provides a force of about 22.5 Newtons.

A method for using the latch system 14 includes several steps. The method begins with the lock tab 24 in the first position as shown in FIGS. 4 and 6 and the lid 18 in the closed position. A user desiring to change the lid 18 from the closed position to the open position continues the method by providing an input to the control system 34 which causes the an amount of power to flow to the shape-memory alloy wire 30 and causes the shape-memory alloy wire 30 to shrink from the first length as shown in FIG. 6 to the second length as shown in 7. The wire guide 32 engages and guides the shape-memory alloy wire 30 as the shape-memory alloy wire 30 changes from the first length to the second length. The changing of length of the shape-memory alloy wire 30 from the first length to the second length causes the tab-mover arm 28 to engage and move the lock tab 24 in a first direction from the first position to the second position to allow the lid 18 to change from the closed position to the open position. In one example, the power is provided at 12 Volts DC and 15 amps.

The method continues with the user no longer providing the input to the control system 34 which stops the flow of power to the shape-memory alloy wire 30 and causes the shape-memory alloy wire 30 to return to the first length from the second length upon cooling. The wire guide 32 engages and guides the shape-memory alloy wire 30 as the shape-memory alloy wire 30 changes from the second length to the first length. The changing of length of the shape-memory alloy wire 30 from the second length to the first length causes the lock tab 24 to move in an opposite second direction from the second position to the first position.

A second method begins with the lock tab 24 in the first position as shown in FIGS. 4 and 6 and the lid 18 in the closed position. A user desiring to change the lid 18 from the closed position to the open position continues the second method by providing an input to the control system 34 which causes an amount of power to flow to the shape-memory alloy wire 30 and causes the shape-memory alloy wire 30 to shrink from the first length to the second length as shown in FIGS. 6 and 7. As the shape-memory alloy wire 30 changes from the first length to the second length, a first section of the shape-memory alloy wire 30 moves in the opposite second direction to cause a second section of the shape-memory alloy wire 30 to move in the first direction. The second section of the shape-memory alloy wire 30 is arranged to extend between and interconnect the tab-mover arm 28 and the first section of the shape-memory alloy wire 30. The wire guide 32 engages and guides the shape-memory alloy wire 30 as the shape-memory alloy wire 30 changes from the first length to the second length. The changing of length of the shape-memory alloy wire 30 from the first length to the second length causes the tab-mover arm 28 to engage and move the lock tab 24 in the first direction from the first position to the second position to allow the lid 18 to change from the closed position to the open position.

In some examples, the shape-memory alloy wire 30 includes a first section of the shape-memory alloy wire 30 and a second section of the shape-memory alloy wire 30 as shown in FIGS. 6 and 7. The first section of the shape-memory alloy wire 30 moves in an opposite second direction to cause a second section of the shape-memory alloy wire 30 to move in the first direction. The second section of the shape-memory alloy wire 30 is arranged to extend between and interconnect the tab-mover arm 28 and the first section of the shape-memory alloy wire 30. In some examples, the first section of the shape-memory alloy wire 30 changes in length in response to power being provided to the shape-memory alloy wire 30 and the second section of the shape-memory alloy wire 30 does not change in length in response to power being provided to the shape-memory alloy wire 30.

The shape-memory alloy wire 30 further includes a length of the first section and a length of the second section. The length of the first section is greater than a length of the second section when the shape-memory alloy wire 30 has either the first or the second lengths. In one example, the first section has a length of about 300 millimeters.

The control system 34 includes a power supply 36, a controller 38, and an input system 40 as shown in FIGS. 1 and 2. The power supply 36 is coupled to the control system 34 and is configured to provide power to the shape-memory alloy wire 30. The controller is coupled to the power supply 36 and the input system 40 and is configured to provide power to the shape-memory alloy wire 30 in response to an input being provided from a user.

In one example, the input system 40 may include a button 42 coupled to the control system 34 and is configured to provide the input in response to engagement of the button 42. In another example, the input system 40 may also include a touch screen 44 coupled to the control system 34 and configured to provide the input in response to engagement of the touch screen 44. The input system may further include a remote device. The remote device is coupled to the control system 34 and is configured to provide the input in response to engagement of the remote device.

In another example, the latch 20 includes a first lock unit 46, a second lock unit 48, and a lock-unit transmission 50. The first lock unit 46 unit is coupled to the container 16 to move relative to the container 16. The second lock unit 48 unit is coupled to the container to move relative to the container. The lock-unit transmission 50 is arranged to extend between and interconnect the first lock unit 46 and the second lock unit 48 to cause movement of the first lock unit 46 to be transmitted to the second lock unit 48. The first lock unit 46 and the second lock unit 48 move away from one another when the latch 20 is in the unlocked configuration and move toward one another when the latch 20 is in the locked configuration, and The first lock unit 46 and the second lock unit 48 each include the lock tab 24, the lock-tab receiver 26, and the tab-mover arm 28 as shown in FIG. 3. The lock tab 24 is movable between a first position as shown in FIG. 6 and a second position as shown in FIG. 7. The lock tab 24 is in the first position when movement of the lid relative to the container is blocked. The lock tab 24 is in the second position when movement of the lid away from the container is permitted. The lock-tab receiver 26 is configured to receive the lock tab 24 therein when the lock tab 24 is in the first position and the lid is in the closed position. The tab-mover arm 28 is coupled to the lock tab to move therewith.

The actuator includes shape-memory alloy wire 30 and control system 34 as shown in FIGS. 2-7. The shape-memory alloy wire is coupled to the first lock unit 46 to cause the first lock unit 46 and second lock unit 48 unit to move in response to changes in length of the shape-memory alloy wire 30 between a first length associated with the locked configuration as shown in FIG. 8 and a relatively smaller second length associated with the unlocked arrangement as shown in FIG. 9. The control system 34 is coupled to the shape-memory alloy wire 30 and configured to apply power to the shape-memory alloy wire 30 to cause the shape-memory alloy wire 30 to change between the first and second lengths in response to receipt of the input to the control system 34. In other examples, the shape-memory alloy wire 30 may be coupled to the second lock unit 48 to cause the first lock unit 46 and the second lock unit 48 to move in response to changes in length of the shape-memory alloy wire 30.

An actuator in accordance with the present disclosure may be used as part of a compartment. The compartment, in one example, may be in a vehicle. The compartment includes a box and a latch. The box includes include a container and a lid. The latch is configured to selectively limit access to the container by blocking movement of the lid. In one example, the container is an engine bay and the lid is a hood of the vehicle. In another example, the container is a trunk and the lid is a trunk lid. In another example, the container is a passenger cabin and the lid is a door of the vehicle.

The following numbered clauses include embodiments that are contemplated and non-limiting:

Clause 1. A glove compartment comprising a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 2. The glove compartment of clause 1, any other clause, or any combination of clauses, further comprising a latch including a lock tab movable between a first position in which movement of the lid relative to the container is blocked when the lid is in the closed position and a second position in which movement of the lid away from the container is permitted, a lock-tab receiver configured to receive the lock tab therein when the lock tab is in the first position and the lid is in the closed position, and a tab-mover arm coupled to the lock tab to move therewith.

Clause 3. The glove compartment of clause 2, any other clause, or any combination of clauses, further comprising an actuator coupled to the tab-mover arm and configured to cause the tab-mover arm to move to cause the lock tab to move between the first and second position in response to an input.

Clause 4. The glove compartment of clause 3, any other clause, or any combination of clauses, wherein the actuator includes a shape-memory alloy wire is coupled to the tab-mover arm to move the tab-mover arm in response to changes in length of the shape-memory alloy wire between a first length associated with the first position and a relatively smaller second length associated with the second position.

Clause 5. The glove compartment of clause 4, any other clause, or any combination of clauses, wherein the actuator further includes a control system coupled to the shape-memory alloy wire and configured to apply power to the shape-memory alloy wire to cause the shape-memory alloy wire to change between the first and second lengths in response to receipt of the input to the control system.

Clause 6. The glove compartment of clause 5, any other clause, or any combination of clauses, wherein the control system includes an input system configured to provide the input and the input system includes a button coupled to the control system and configured to provide the input in response to engagement of the button.

Clause 7. The glove compartment of clause 5, any other clause, or any combination of clauses, wherein the control system includes an input system configured to provide the input and the input system includes a touch screen coupled to the control system and configured to provide the input in response to engagement of the touch screen.

Clause 8. The glove compartment of clause 5, any other clause, or any combination of clauses, wherein the control system includes an input system configured to provide the input and the input system includes a remote device in communication with the control system and configured to provide the input in response to engagement of the remote device.

Clause 9. The glove compartment of clause 5, any other clause, or any combination of clauses, wherein the actuator includes a wire guide coupled to the container and configured to engage and guide the shape-memory alloy wire as the shape-memory allow wire changes between the first length and the relatively smaller second length.

Clause 10. The glove compartment of clause 9, any other clause, or any combination of clauses, wherein the wire guide is a pulley configured to rotate about an axis relative to the container in response to the shape-memory alloy wire changing between the first length and the relatively smaller second length.

Clause 11. The glove compartment of clause 5, any other clause, or any combination of clauses, wherein the lock tab moves in a first direction from the first position to the second position and a first section of the shape-memory alloy wire moves in an opposite second direction to cause a second section of the shape-memory alloy wire to move in the first direction and the second section of the shape-memory alloy wire is arranged to extend between and interconnect the tab-mover arm and the first portion of the shape-memory alloy wire.

Clause 12. The glove compartment of clause 11, any other clause, or any combination of clauses, wherein the first section of the shape-memory alloy wire changes in length in response to power being provided to the shape-memory alloy wire and the second section of the shape-memory alloy wire does not change in length in response to power being provided to the shape-memory alloy wire.

Clause 13. The glove compartment of clause 12, any other clause, or any combination of clauses, wherein a length of the first section is greater than a length of the second section when the shape-memory alloy wire has either the first or the second lengths.

Clause 14. A glove compartment comprising a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 15. The glove compartment of clause 14, any other clause, or any combination of clauses, further comprising a latch coupled to the container to change between a locked configuration in which movement of the lid from the closed position is blocked and an unlocked configuration in which movement of the lid from the closed position is permitted.

Clauses 16. The glove compartment of clause 15, any other clause, or any combination of clauses, wherein the latch includes a first lock unit coupled to the container to move relative to the container.

Clause 17. The glove compartment of clause 16, any other clause, or any combination of clauses, wherein the latch includes a second lock unit coupled to the container to move relative to the container.

Clause 18. The glove compartment of clause 17, any other clause, or any combination of clauses, wherein the latch includes a lock-unit transmission arranged to extend between and interconnect the first lock unit and the second lock unit to cause movement of the first lock unit to be transmitted to the second lock unit.

Clause 19. The glove compartment of clause 18, any other clause, or any combination of clauses, wherein the first and second lock units move away from one another when the latch is in the unlocked configuration and move toward one another when the latch is in the locked configuration.

Clause 20. The glove compartment of clause 19, any other clause, or any combination of clauses, further comprising an actuator coupled to the latch to cause the latch change between the locked and unlocked configurations in response to an input.

Clause 21. The glove compartment of clause 20, any other clause, or any combination of clauses, wherein the actuator includes a shape-memory alloy wire coupled to the first lock unit to cause the first lock unit and second lock unit to move in response to changes in length of the shape-memory alloy wire between a first length associated with the locked configuration and a relatively smaller second length associated with the unlocked arrangement and a control system coupled to the shape-memory alloy wire and configured to apply power to the shape-memory alloy wire to cause the shape-memory alloy wire to change between the first and second lengths in response to receipt of the input to the control system.

Clause 22. An actuator for a latch, the actuator comprising a shape-memory alloy wire coupled to a first lock unit and a second lock unit to cause the first lock unit and the second lock unit to move in response to changes in length of the shape-memory alloy wire between a first length associated with the locked configuration and a relatively smaller second length associated with the unlocked arrangement.

Clause 23. The actuator of clause 22, any other clause, or any combination of clauses, further comprising a control system coupled to the shape-memory alloy wire and configured to apply power to the shape-memory alloy wire to cause the shape-memory alloy wire to change between the first and second lengths in response to receipt of the input to the control system.

Clause 24. A compartment of a vehicle, the compartment comprising
a box adapted to be coupled to a vehicle in a fixed position relative to the vehicle, the box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 25. The compartment of clause 24, any other clause, or any combination of clauses, further comprising a latch including a lock tab movable between a first position in which movement of the lid relative to the container is blocked when the lid is in the closed position and a second position in which movement of the lid away from the container is permitted.

Clause 26. The compartment of clause 25, any other clause, or any combination of clauses, wherein the latch includes a lock-tab receiver configured to receive the lock tab therein when the lock tab is in the first position and the lid is in the closed position.

Clause 27. The compartment of clause 26, any other clause, or any combination of clauses, wherein the latch further includes a tab-mover arm coupled to the lock tab to move therewith.

Clause 28. The compartment of clause 27, any other clause, or any combination of clauses, further comprising an actuator coupled to the tab-mover arm and configured to cause the tab-mover arm to move to cause the lock tab to move between the first and second position in response to an input.

Clause 29. The compartment of clause 28, any other clause, or any combination of clauses, wherein the actuator includes a shape-memory alloy wire coupled to the tab-mover arm to move the tab-mover arm in response to changes in length of the shape-memory alloy wire between a first length associated with the first position and a relatively smaller second length associated with the second position.

Clause 30. The compartment of clause 29, any other clause, or any combination of clauses, wherein the actuator further includes a control system coupled to the shape-memory alloy wire and configured to apply power to the shape-memory alloy wire to cause the shape-memory alloy wire to change between the first and second lengths in response to receipt of the input to the control system.

The invention claimed is:
1. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch including a lock tab movable between a first position in which movement of the lid relative to the container is blocked when the lid is in the closed position and a second position in which movement of the lid away from the container is permitted, a lock-tab receiver configured to receive the lock tab therein when the lock tab is in the first position and the lid is in the closed position, and a tab-mover arm coupled to the lock tab to move therewith, and
an actuator coupled to the tab-mover arm and configured to cause the tab-mover arm to move to cause the lock tab to move between the first and second position in response to an input,
wherein the actuator includes a shape-memory alloy wire coupled to the tab-mover arm to move the tab-mover arm in response to changes in length of the shape-memory alloy wire between a first length associated with the first position and a relatively smaller second length associated with the second position and a control system coupled to the shape-memory alloy wire and configured to apply power to the shape-memory alloy wire to cause the shape-memory alloy wire to change between the first and second lengths in response to receipt of the input to the control system.

2. The glove compartment of claim 1, wherein the control system includes an input system configured to provide the input and the input system includes a button coupled to the control system and configured to provide the input in response to engagement of the button.

3. The glove compartment of claim 1, wherein the control system includes an input system configured to provide the input and the input system includes a touch screen coupled to the control system and configured to provide the input in response to engagement of the touch screen.

4. The glove compartment of claim 1, wherein the control system includes an input system configured to provide the input and the input system includes a remote device in communication with the control system and configured to provide the input in response to engagement of the remote device.

5. The glove compartment of claim 1, wherein the actuator includes a wire guide coupled to the container and configured to engage and guide the shape-memory alloy wire as the shape-memory allow wire changes between the first length and the relatively smaller second length.

6. The glove compartment of claim 5, wherein the wire guide is a pulley configured to rotate about an axis relative to the container in response to the shape-memory alloy wire changing between the first length and the relatively smaller second length.

7. The glove compartment of claim 1, wherein the lock tab moves in a first direction from the first position to the second position and a first section of the shape-memory alloy wire moves in an opposite second direction to cause a second section of the shape-memory alloy wire to move in the first direction and the second section of the shape-memory alloy wire is arranged to extend between and interconnect the tab-mover arm and the first portion of the shape-memory alloy wire.

8. The glove compartment of claim 7, wherein the first section of the shape-memory alloy wire changes in length in response to power being provided to the shape-memory alloy wire and the second section of the shape-memory alloy wire does not change in length in response to power being provided to the shape-memory alloy wire.

9. The glove compartment of claim 8, wherein a length of the first section is greater than a length of the second section when the shape-memory alloy wire has either the first or the second lengths.

10. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch coupled to the container to change between a locked configuration in which movement of the lid from the closed position is blocked and an unlocked configuration in which movement of the lid from the closed position is permitted, the latch including a first lock unit coupled to the container to move relative to the container, a second lock unit coupled to the container to move relative to the container, and a lock-unit transmission arranged to extend between and interconnect the first lock unit and the second lock unit to cause movement of the first lock unit to be transmitted to the second lock unit, and
wherein the first and second lock units move away from one another when the latch is in the unlocked configuration
an actuator coupled to the latch to cause the latch change between the locked and unlocked configurations in response to an input,
wherein the actuator includes a shape-memory alloy wire coupled to the first lock unit to cause the first lock unit and second lock unit to move in response to changes in length of the shape-memory alloy wire between a first length associated with the locked configuration and a relatively smaller second length associated with the unlocked arrangement and a control system coupled to the shape-memory alloy wire and configured to apply power to the shape-memory alloy wire to cause the shape-memory alloy wire to change between the first and second lengths in response to receipt of the input to the control system.

11. An actuator for a latch, the actuator comprising
a shape-memory alloy wire coupled to a first lock unit to cause the first lock unit and a second lock unit to move relative to one another in response to changes in length of the shape-memory alloy wire between a first length associated with a locked configuration and a relatively smaller second length associated with an unlocked arrangement and
a control system coupled to the shape-memory alloy wire and configured to apply power to the shape-memory alloy wire to cause the shape-memory alloy wire to change between the first and second lengths in response to receipt of an input to the control system.

12. A compartment of a vehicle, the compartment comprising
a box adapted to be coupled to a vehicle in a fixed position relative to the vehicle, the box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch including a lock tab movable between a first position in which movement of the lid relative to the container is blocked when the lid is in the closed position and a second position in which movement of the lid away from the container is permitted, a lock-tab receiver configured to receive the lock tab therein when the lock tab is in the first position and the lid is in the closed position, and a tab-mover arm coupled to the lock tab to move therewith, and
an actuator coupled to the tab-mover arm and configured to cause the tab-mover arm to move to cause the lock tab to move between the first and second position in response to an input,
wherein the actuator includes a shape-memory alloy wire coupled to the tab-mover arm to move the tab-mover arm in response to changes in length of the shape-memory alloy wire between a first length associated with the first position and a relatively smaller second length associated with the second position and a control system coupled to the shape-memory alloy wire and configured to apply power to the shape-memory alloy wire to cause the shape-memory alloy wire to change between the first and second lengths in response to receipt of the input to the control system.

13. The actuator of claim 11, wherein the first lock unit and the second lock unit to move away from one another in response to changes in length of the shape-memory alloy wire between the first length and the second length.

* * * * *